March 14, 1950 E. E. MICHAELIS 2,500,318
DISPLAY DEVICE
Filed May 13, 1948
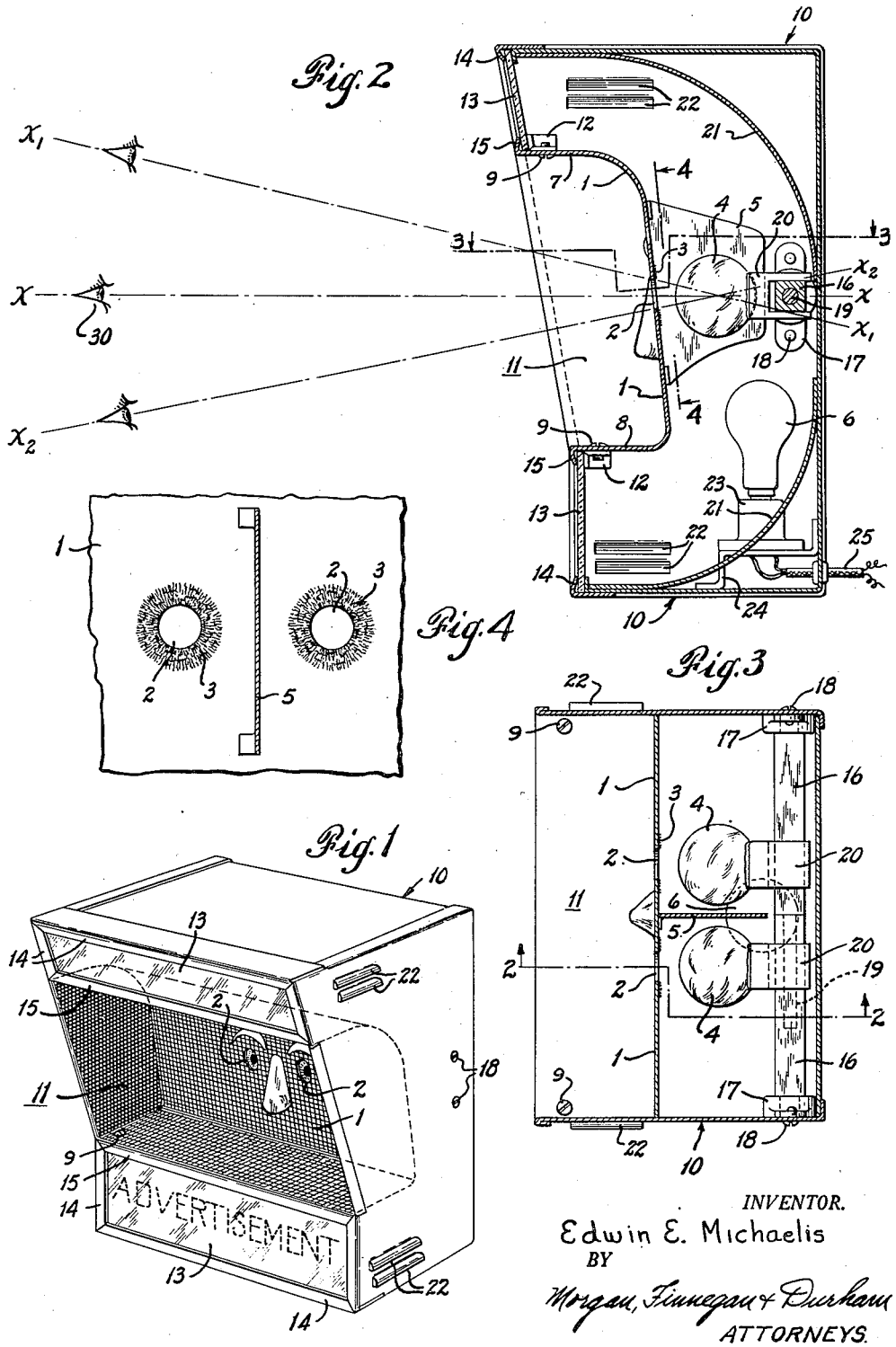
INVENTOR.
Edwin E. Michaelis
BY
Morgan, Finnegan & Durham
ATTORNEYS.

Patented Mar. 14, 1950

2,500,318

UNITED STATES PATENT OFFICE 2,500,318

DISPLAY DEVICE

Edwin E. Michaelis, New York, N. Y.

Application May 13, 1948, Serial No. 26,741

20 Claims. (Cl. 272—8)

This invention relates generally to display devices and relates more particularly to display devices used for attracting and holding the attention of an observer particularly in connection with a display for sales and advertising purposes.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

One of the objects of this invention is to provide a new, useful and improved display device which will not only create the illusion or appearance of an eye or eyes but which will apparently cause the eye or eyes to follow the movements of an observer.

Another object of this invention is to provide a display device which will create the illusion or appearance of an eye or eyes including iris, pupil, lens and cornea of appearance, texture, color and proportion more nearly approximating these characteristics as they exist in a real eye than in an artificial eye.

Another object of this invention is to provide a new, useful and improved display device for such uses as sales, advertising, decorative, and/or amusement purposes.

Another object of this invention is to impart to an illuminated display device, novel compelling and attention arresting features through the provision of a novel image forming means serving to heighten and sustain the interest and attention of an observer in the display as a whole.

Of the drawings:

Figure 1 is a generally frontal and side view in perspective of a typical and illustrative embodiment of a display device in accordance with this invention;

Figure 2 is a view in vertical section of the embodiment of Figure 1, the view being taken partly along a vertical plane between and parallel to the side walls of the device and partly along a separate plane parallel to the first mentioned plane, the view along said planes corresponding to a view taken along the line 2—2 of Figure 3, identified below, and including a diagrammatic showing of the relationship of certain parts of the device to the eye of an observer in a typical viewing position;

Figure 3 is a view in section taken along the line 3—3 of Figure 2; and,

Figure 4 is a fragmentary view in section taken along the line 4—4 of Figure 2 and showing the representation of side-by-side irises constituting a detail of the device.

In general, the objects of this invention are accomplished through the provision of means for mirroring a selected object together with means including a view member having a front light-absorbent "view" face, having a rear light-reflective "object" face presenting to the mirror means the object to be mirrored, and having a view aperture of desired shape extending from front to rear and serving to complement the object image when formed by imparting thereto centrally thereof a dark portion, spot or area of a configuration corresponding to that of the aperture.

This apertured view member is opaque to light except over the aperture area. Its light absorbent face is characterized by a low reflective capacity to incident light and is hence preferably black whereas its rear face is characterized by a high reflective capacity to incident light and for most purposes may be a matte white.

By imparting the representation of an optic iris to the object face of the view member in surrounding relation to a view aperture of circular, oval or other desired shape, the object face may be made to present to the field of the mirror means as an object, an "eye" unit comprised of a pupil portion corresponding to the aperture, an annular iris portion concentric therewith, and a cornea portion of selected outer dimension surrounding the iris portion.

The mirror means is or are disposed at the rear of and in spaced relation to the view member opposite the view aperture so as to mirror the object image formed through the aperture, the image formed being of a size at least sufficient to fill the view aperture. The absence of a light reflecting surface over the area of the view aperture, results in the latter causing the appearance over the corresponding area of the image formed, of a dark spot which in the case of an "eye" unit as the object, will represent the pupil of the eye. Moreover, by providing mirror means forming a virtual image, the visible reflecting surface of the mirror will appear as a lens over the relatively dark central portion of the image and, in the case of the "eye" image, thus impart a very high degree of realism thereto. The more intense the incident light on the back surface of the view member, the brighter will be the image formed. Hence, means are preferably provided for brightly lighting the back face of the view member, preferably, with white light, although it will be apparent that colored light may be utilized, if desired, to achieve unusual effects and this may be correlated also with the use of a colored reflecting surface of the mirror, with the same object in view.

For greatest realism, the cornea white portion of an "eye" image, as seen through the aperture in the view member, should extend to the aperture perimeter. Hence, with an "eye" unit on the back of the view member as the object, the characteristics of the mirror means, as regards distance of center of curvature from the view aperture, must be chosen in accordance with known physical laws to produce an image of the object at least equal in size to the size of the view, or pupil, aperture.

It will be apparent also that when the principal axis of the mirror means is normal, or substantially normal, to the plane of the view aperture, concentric with the aperture and coincident with an observer's line of sight, the image will appear to be centered, or substantially centered, in the view aperture. However, as the observer moves, changing the relation of his line of sight angularly to the aperture, the relative position of the image in the mirror field will change correspondingly and the image will appear to follow the observer's movement, whether the movement be up, down, or from side-to-side. Moreover, by shifting the mirror means so that its principal axis is eccentric to the view aperture, the image position in the aperture may be made to vary, thus permitting in the case of an "eye" image, for example, of the obtainment of a "cross" or "wall" eye effect, or of an eye cast upward or downward. Through suitable mechanical means for shifting the mirror means, continuous or discontinuous movement of the "eye" image may be obtained in any desired pattern of movement.

In accordance with the invention, moreover, the apertured view member may be provided with a plurality of apertures arranged in pairs in side-by-side relationship, each aperture having its own mirror means spaced rearwardly of the view member. Thus, at the front face of the view member, there may be created the appearance of a pair or pairs of eyes and the light-absorbent view face of the apertured view member may be provided with suitable modeling light reflective portions or surfaces suitably arranged and/or disposed with respect to the "eyes," to convey to the observer the effect of a face of either natural or grotesque appearance as may be desired. The paired or twin mirror means in such case are preferably suitably separated from each other by suitable light reflective partition means between the view apertures dimensioned to prevent the object constituted by one "eye" unit from reflecting into the mirror means for the other and thereby producing interference patterns.

In accordance with the invention also, the view member is preferably suitably extended and arranged to form a "shadow box" open at the front only so as to frame the view apertures or apertures in an extremely dark setting against which the image or images formed will stand out in enhanced brilliance with a startling and compelling interest attracting effect. Moreover, the mirror means and the means for illuminating the rear face of the view member may be encased in a suitable light tight housing which may be formed in part by the view member so as to reduce stray light which may otherwise prove distracting to the observer while obtaining more effective illumination of the rear face of the view member. Through the provision of a suitable front opening or openings in such housing adapted to receive display or advertising material in the form of transparencies, letters or the like, illuminated from the back, a novel and improved form of display device is obtained in which the illumination for the display or advertising material and for the object face of the view member is effectively and efficiently obtained from the same light source, in an extremely simple and economic fashion.

It will be understood that the foregoing general description and the following detailed description as well are exemplary and explanatory of the invention but are not restrictive thereof.

Referring now more particularly to the embodiment of this invention depicted in the accompanying drawings, a view, or eye member 1 of wood, metal, cardboard, or other suitable light opaque material is provided with side-by-side circular view, or pupil, apertures 2 of equal diameter each of which is surrounded by the representation of an iris 3 on the back of the eye member. The back of the eye member corresponds to the right-hand side as viewed in Figure 2. The apertures 2 are spaced from each other a suitable distance preferably an amount sufficient to give to them a satisfactory proportionate spacing as seen from the front. The front side of the eye member is a highly light absorbent surface and may be covered with black velvet, or painted a dull black for this purpose, or otherwise suitably treated. The back side of the eye member is preferably flat over a substantial area around the apertures 2 and is a highly light reflective surface, preferably a matte white.

A pair of ball mirrors 4 are supported, preferably adjustably, behind the apertures 2, one opposite each aperture and spaced each from the eye member 1 in preferably centered relation to the opposing aperture so that the aperture center will lie substantially on the principal axis of the useable field of the mirror. The ball mirrors 4 have a silvered or otherwise suitably treated reflecting surface of high light reflecting capacity and are of a radial dimension and spacing from the aperture selected to form an image of the selected eye unit on the back of the eye member 1, of a size at least equal to that of the aperture and filling the aperture. As here preferably embodied each ball mirror 4 is a silvered spherical element such as is commonly used as an ornament for Christmas trees and each is preferably partitioned from the other by a partition member 5 of high light reflecting capacity secured vertically to the back of the eye member 1 midway of the apertures 2. Illuminating means such as an incandescent electric light 6 is or are mounted back of the eye member 1, preferably below and midway of the ball mirrors 4 so as to illuminate the back of the eye member 1 and the mirrors 4 upwardly from below.

The eye member 1 as here preferably embodied is provided with top and bottom substantially parallel extension portions 7 and 8, respectively, extending forwardly therefrom and secured, preferably removably, each at its opposite ends, as by means of screws 9, to a substantially light tight casing or housing 10 enclosing the eye member 1, the mirrors 4 and lamp 6. The housing 10 preferably comprises top, bottom, back and side wall portions and is open at the front to receive the eye member 1 snugly between its opposing side walls so as to form therewith a "shadow box" 11 open at the front, and closed at the back except for the eye apertures 2 in the pupil member 1 forming the back of the box. All of the inner walls of the box are highly light absorbent and the latter may be provided around the eye apertures 2 with representations of other facial parts such as a nose and eyebrows as shown, these having a moderately high light reflecting capacity so as to be apparent without detracting from the brilliance of the "eyes" in use. Brackets 12 carried by the side walls of the housing 10 are adapted to receive threadedly the screws 9.

The housing 10 is preferably suitably dimensioned to be spaced from the eye member 1 at the top and bottom, so as to provide panel openings in which panels 13 displaying advertising copy or other display material may be arranged so as to permit of their being back-lighted from within the housing. As here preferably embodied, the display panels 13 are of translucent material and are removably mounted in the respective top and bottom openings. Marginal flanges 14 at the top, bottom and sides of the housing and marginal flanges 15 on the extension portions 7 and 8 are disposed and arranged to coact in locating and securing the display panels in position while enabling their removal for replacement with facility.

Means are provided within the housing 10 for adjustably supporting the ball mirrors 4 to permit of their manual adjustment independently either toward or away from the related aperture, or transversely of the aperture. The supporting means as here preferably embodied comprises separate horizontally disposed and coaxially aligned male and female pivot members 16 respectively each journalled at its outer end for angular movement in a bearing 17 removably secured to the respective side walls of the housing as by means of screws 18. The male pivot member 16 is reduced in diameter at its inner end to provide a male axle portion 19 which is journalled in a corresponding socket in the female member 16. Thus, the pivot members 16 may be independently angularly adjusted.

A pair of identical yoke shaped mounting members 20 disposed at opposite sides of the partition 20 slidably, freely and separately embrace the respective pivot members 16 at their yoke ends so as to permit of limited independent movement of each mounting member both axially and transversely of the pivot members and limited angular movement relative thereto as well. Each mounting member 20 carries at its other end one of the mirrors 4 which may advantageously be adhesively bonded thereto, the attaching end of the member being preferably of a mating configuration to the mirror surface to facilitate mounting. Thus, within limits each mirror may be separately positioned in substantially any desired relation to the opposing aperture so as to change at will the relative position of the principal axis of the useable mirror field to the pupil aperture center.

Means are provided within the housing 10 for intensifying the illumination of the back of the pupil member 1 and of the display panels 13. To this end and as here preferably embodied, the housing is equipped with a pair of curved reflecting members 21 suitably fashioned and arranged to concentrate light from the lamp 6 to the back of the eye member 1 and thus permit of the use of a relatively low power lamp for illumination. At the same time, the members 21 are designed to direct an increased amount of light to the back of the display panels 13 with preferably a greater illumination of the upper panel than the lower panel.

Ventilating apertures 22 may be provided as desired in the housing 10 and suitable means such as the lamp socket 23 and lamp bracket 24 may be provided for supporting the lamp 6 in desired relation to the pupil member 1 and mirrors 4. Power may be supplied to the lamp through the lead 25.

It will be noted that the display device as shown in the drawings has the eye member 1 forwardly inclined from the vertical as viewed in Figure 2. This is advantageous since display units as a whole are generally mounted in an elevated position relative to an observer. The inclination of the eye member presents the eye apertures 2 in better perspective to the observer and the slight angularity between the respective principal axis of the mirrors 4 and the respective planes of the eye apertures 2 results in no appreciable distortion of the image formed apparent to the observer.

In operation of the device illustrated, the lamp 6 when lit will brightly illuminate the back of the eye member 1 and will also illuminate the ball mirrors 4. A virtual reduced size image of each object constituted by the iris and cornea portions on the back surface of the eye member 1 surrounding the respective eye apertures 2, will be formed by the respective ball mirrors 4 and be observable through the respective pupil apertures 2.

To an observer stationed at a typical viewing position indicated by the representation of an eye 30 in Figure 2, these images will appear as a brilliant eye unit centrally of and within each eye aperture 2, each unit having a central dark circular pupil portion, an iris portion surrounding the pupil portion, a white cornea portion surrounding the iris portion and filling the aperture 2, and a lens portion apparently overlying the pupil-iris area. The brilliance of the eye unit is enhanced by the light absorptive properties of the "shadow box" 11.

It will be observed that in Figure 2 with respect to the aperture 2, the center of the ball mirror 4 and the center of the related eye aperture lie on a horizontal sight line $x$—$x$ extending at substantially right angles to the plane of the related aperture and constituting the principal axis of the ball mirror. Hence, the image formed will extend equal radial distances outwardly from this axis and in short, be substantially centered in and fill the eye aperture. Relative angular displacement of this principal axis to the dotted line position $x_1$—$x_1$ or $x_2$—$x_2$ such as would result from a movement of the eye 30 up or down to such a position, as indicated in Figure 2, would create an apparent shifting of the image on the mirror surface in the same direction, thus creating an eye following effect to the observer. The same result would follow from movement of the observer in any direction paralleling the apertures 2.

If the ball mirrors 4 are shifted relative to the apertures 2, so that the principal axis of the mirror is no longer coincident with the center of the aperture, the image formed will be shifted relative to the aperture plane so as to show a greater or less amount of cornea portion in one area of the image than in another. The eyes may thus be given the effect of being crossed, or wall eyed, or cast up or down separately or together.

Illustrative of a practical dimensional parameter in a display device in accordance with this invention, the eye apertures may each be one inch in diameter with the annular iris representation having an outside diameter of two inches. In such case, a mirror globe such as a silver colored Christmas tree ornament above-noted, having a diameter of two and three-quarter inches will form an image of correct proportion when placed with its center of curvature at a distance of two and one-eighth inches from the back face of the eye member. Adequate illumination for such a system will be provided by a twenty-five watt lamp.

The invention in its broader aspects is not limited to the specific mechanisms shown and described but departures may be made therefrom within the scope of the accompanying claims without departing from the principles of the invention and without sacrificing its chief advantage.

What is claimed is:

1. A display device comprising a member having a front face, a back face and an aperture connecting said faces, said back face over an area surrounding said aperture constituting an object to be mirrored; and, mirror means spaced from said back face opposite said aperture for forming an image of said object viewable from said front face through said aperture.

2. A display device comprising a member having a front face, a back face and an aperture connecting said faces, said back face over an area surrounding said aperture constituting an object to be mirrored; and, convex mirror means spaced from said back face opposite said aperture for forming a virtual image of said object viewable from said front face through said aperture.

3. A display device comprising a member having a front face, a back face and an aperture connecting said faces, said back face over an area surrounding said aperture constituting an object to be mirrored; and, convex mirror means spaced from said back face opposite said aperture for forming a virtual reduced size image of said object at least as large as said aperture and viewable from said front face through said aperture.

4. A display device comprising a member having a front face, a back face and an aperture connecting said faces, said back face over an area surrounding said aperture constituting an object to be mirrored, said object including the representation of an optic iris surrounding said aperture; and, convex mirror means spaced from said back face opposite said aperture for forming a virtual reduced size image of said object at least as large as said aperture and viewable from said front face through said aperture.

5. The device of claim 4 including means for illuminating the back face of said member.

6. The device of claim 5 wherein said illuminating means serves also to illuminate said mirror means.

7. The device of claim 4 in which said object includes a substantially matte white area surrounding its iris area, representative of a cornea area.

8. The device of claim 7 in which the front face of said member is highly light absorbent.

9. A display device comprising a member having a front face, a back face and an aperture connecting said faces; said back face over a selected area surrounding said aperture constituting an object including portions of different light reflecting capacities; mirror means spaced from said back face opposite said aperture for forming an image of said object viewable from said front face through said aperture; and means for illuminating said object.

10. A display device comprising a member having a front face, a back face and an aperture connecting said faces, said back face over a selected area surrounding said aperture constituting an object to be mirrored, said object including portions of different light reflecting capacity; and, a spherical mirror spaced from said back face opposite said aperture for forming a reduced size virtual image of said object viewable from said front face through said aperture.

11. The device of claim 10 including means for illuminating said object.

12. The device of claim 10 in which the center of figure of said aperture lies substantially on the principal axis of said mirror.

13. The device of claim 10 including means for adjustably mounting said mirror relative to said aperture.

14. A display device comprising a member of light opaque material having a highly light absorbent front face adapted to be presented to an observer, a highly light reflective rear face having a substantially plane surfaced portion, and a pair of side-by-side apertures in said portion; a pair of spherical mirrors disposed in back of said rear face, the respective mirrors being arranged opposite the respective apertures with the principal axis of each mirror field intersecting the opposing aperture; a light reflecting partition member extending rearwardly from said plane surfaced portion between said mirrors, said partition member serving to divide said portion into separate object areas presenting separate objects to the separate mirrors and said partition member being additionally of a size sufficient to hide each mirror from front view except through its opposing aperture, and, means for illuminating said separate object areas and mirrors, whereby each mirror will form a bright image of the object in its opposing object area, viewable through the opposing aperture and having a central dark spot complementary to the aperture.

15. A display device comprising a view member having a light absorbent front face, a viewing aperture and a light reflecting back face, the latter including a substantially plane-surfaced object portion surrounding the aperture, said object portion being adapted to be mirrored through said aperture; a housing forming a lamp chamber with said view member, the latter being disposed to present its said light reflecting object portion to said chamber and also being spaced along a marginal portion from said housing to provide a separate display opening through which light is adapted to be emitted from said chamber; lamp means in said chamber for illuminating said object and for emitting light through said display opening; and, mirror means in said chamber opposite said viewing aperture for reflecting an image of said object portion through said aperture.

16. The device of claim 15 in which said mirror means is convex.

17. The device of claim 15 in which said object portion includes the representation of an optic iris around said aperture and in which said mirror means is convex and of spherical contour.

18. The device of claim 15 in which said view member has two apertures in side-by-side relation surrounded each by its own object portion and in which separate mirror means are provided and are positioned opposite the respective apertures.

19. The device of claim 15 including light reflecting baffle means disposed between the separate mirror means and extending from said view member.

20. The device of claim 15 in which said view member is disposed wholly within the confines of said housing and includes marginal extensions disposed and arranged to coact with said housing to form a "shadow box" recess.

EDWIN E. MICHAELIS.

REFERENCES CITED

The following references are of record in the file of this patent:

UNITED STATES PATENTS

| Number | Name | Date |
| --- | --- | --- |
| 2,189,568 | Miller | Feb. 6, 1940 |
| 2,399,121 | Janson | Apr. 23, 1946 |